United States Patent [19]

Counoupas

[11] Patent Number: 4,804,277
[45] Date of Patent: Feb. 14, 1989

[54] BEARING MOUNTING SYSTEM

[75] Inventor: Steve S. Counoupas, Rochester, N.Y.

[73] Assignee: Xerox Corporation, Stamford, Conn.

[21] Appl. No.: 134,669

[22] Filed: Dec. 18, 1987

[51] Int. Cl.$^4$ .......................... F16C 43/04; F16C 23/06
[52] U.S. Cl. ...................................... 384/537; 384/493; 384/542
[58] Field of Search ............... 384/493, 495, 510, 537, 384/542, 557–562, 584, 585, 903, 905, 906

[56] References Cited

U.S. PATENT DOCUMENTS

| H242 | 4/1987 | Eng | 384/537 X |
|---|---|---|---|
| 2,239,154 | 4/1941 | Keane | 384/537 |
| 2,435,067 | 1/1948 | Beatty | 308/236 |
| 2,936,200 | 5/1960 | Kelly | 308/196 |
| 3,469,897 | 9/1969 | Rike | 308/236 |
| 4,046,432 | 9/1977 | Hofmann et al. | 308/189 R |
| 4,606,656 | 8/1986 | LaRou | 384/475 |

FOREIGN PATENT DOCUMENTS

| 57-171121 | 10/1982 | Japan. | |
| 0707588 | 4/1954 | United Kingdom | 384/585 |
| 0894743 | 4/1962 | United Kingdom | 384/903 |

OTHER PUBLICATIONS

Mechanical Engineers' Handbook; Sixth Edition, 12/1958, pp. 8–144, Baumeister ed.

Primary Examiner—Stuart S. Levy
Assistant Examiner—Thomas R. Hannon

[57] ABSTRACT

A bearing mounting system for mounting and retaining a rotatable shaft between first and second bearings mounted to first and second spaced frame members of a machine frame, utilizing commercially available bearings, with respective inner and outer races. Both bearings inner races are press fitted onto the shaft. A first bearing mount rigidly secures a first bearing outer race to one of the frame members. A second bearing mount provides for axial movement of the second bearing outer race relative to the second frame member but prevents rotation of that outer race. The second mount includes a round aperture in the second frame member through which the second bearing outer race is axially moveable, and a notch aperture adjacent to the round aperture, and a clamp removably clamped to the outer race and moveable therewith. The clamp is axially but not rotatably moveable within the notch aperture in the second frame member. Preferably the clamp is generally cylindrical and smooth surfaced, and is partially notched to fit over and be fastened to a minor portion of the outer race.

9 Claims, 2 Drawing Sheets

BEARING MOUNTING SYSTEM

Hereby cross-referenced is copending application U.S. Ser. No. 049,197, entitled Bearing Mounting, filed May 13, 1987, now U.S. Pat. No. 4,758,101 by the same assignee, This invention relates generally to rotary bearing mountings, and more particularly concerns a bearing mounting system for supporting shaft bearings in a frame, especially between spaced frame members of a copier, to prevent damage to the frame or bearing by preventing rotation of the outer race of the bearing relative to the frame yet allowing for axial displacement.

It is common practice to mount bearings directly into the frame of a copying or printing machine or other apparatus to support rotary shafts by various mounting methods. Such shafts may support and/or drive paper feed rollers, etc.. Many such bearings and shafts are used in a copier or printer. Conventional mounting arrangements have a significant disadvantage in that a bearing failure frequently results in a frame failure as well. A frame failure requires extensive field repair procedures and/or expensive levels of field assembly replacements. A type of frame failure frequently encountered is fretting or abrasion wear resulting from undesired rotation of the bearing outer race with respect to the mounting frame. Bearing and frame failures due to outer bearing race directional rotation in the frame mounting hole, and/or insufficient accommodation of shaft expansion, have been identified as major copier failure modes and repair items. Another bearing failure mode is from undesired side thrust on the bearing, due to shift expansion or contraction, or frame movement, or tolerance differences. Furthermore, even the initial installation and removal of shaft and bearing assemblies frequently is difficult and requires excessive time.

There is disclosed herein a low cost mounting system for rotary shaft bearings. It enables the mounting of simple, conventional, inexpensive, unmodified, roller bearings to frames without the above problems.

In the disclosed embodiment here, one end bearing outer race may be clamped by a simple, open, spring clamp fastener. The other bearing outer race is held against rotation by a fastener which allows shaft expansion and accommodates frame tolerance by allowing axial bearing movement, but prevents any rotation of the outer race. This mounting system uses existing, conventional, low cost bearings, low cost fasteners, and conventional mounting tools.

That is, there are disclosed two different bearing mountings for opposite end bearings of a shaft, both of which allow easier shaft mounting into a frame, and prevent relative rotational motion between the outer races of the bearing and the frame. Both bearing mountings prevent outer race rotational motion by applying fully effective rotational restraint to the outer race. However, one bearing mount is designed to allow axial movement of the entire bearing. Since rotational motion is prevented, chucking is absent even in stop-start or reversing operations.

In prior designs the roller bearing could fail by causing destruction of its mating parts (shaft or housing) due to relative rotation between them. This new bearing mounting design solves this and various other problems of bearing mounting. With this present design there is no plastic surrounding the outer race to wear out due to chucking (from starts, stops, or changes in rotation of the shaft and inner race). Also, with this design, any size rolls can be mounted on the shaft.

Various types of bearings and mountings are known. The following disclosures are noted:

Japanese App. No. 56-55361 filed Apr. 13, 1981 and laid open Oct. 21, 1982 as Laid Open No. 57-171121 by M. Marakami [Iseki Koki K.K.] re a mounting allowing axial movement; Rike U.S. Pat. No. 3,469,897 re a clamping mount; and Hofmann U.S. Pat. No. 4,046,432 re a key outer race restrainer (but the key is clamped to the housing rather than the outer race, and a special or modified inner and outer race is required).

Said U.S. Pat. No. 4,046,432 Col. 1, lines 12–29, notes the problem areas and difficulties and expenses in bearings of this type and provides acknowledgement thereof in this art, including the need for restraining axial rotation but allowing axial movement.

Further evidencing the long standing and well recognized nature of the problem addressed here is the *Mechanical Engineers' Handbook,* Sixth Edition, 1958, page 8-144 stating that:

"In rigid mountings, provision must be made for expansion, either by building slip clearance into one mount or by using a straight roller bearing on the free end of the mechanism. Care must be exercised when designing the slip fit, as too loose a fit will encourage spinning of the bearing on the shaft or in the housing."

Also noted for background are U.S. Pat. No. 2,435,067 to Beatty; U.S. Pat. NO. 2,936,200 to Kelly and U.S. Pat. No. 4,606,656 to LaRou.

The present invention overcomes various of the above-discussed problems, and provides various of the above and other features and advantages.

A feature of the specific embodiment disclosed herein is to provide a bearing mounting system for mounting and retaining a rotatable shaft in a machine frame between first and second rotatable bearings respectively mounted to first and second spaced frame members of said machine frame, utilizing commercially available bearings, with respective inner and outer races, and with said shaft mounted to said inner races; comprising:

first mounting means for rigidly mounting a first bearing outer race to one said frame member, said first mounting means preventing both rotational and axial movement of said first bearing outer race relative to said first frame member and second mounting means for mounting a second bearing outer race to a second frame member, said second mounting means providing for axial movement of said second bearing outer race relative to said second frame member but preventing rotation of said second bearing outer race relative to said second frame member, said second mounting mans including a round aperture in said second frame member through which said second bearing outer race is axially mounted and axially moveable, and a notch aperture in said second frame member adjacent to said round aperture, and outer race clamping means removably clamped to said second bearing outer race and moveable therewith, said outer race clamping means of said second mounting means being axially mounted within and axially moveable within said notch aperture in said second frame member, said notch aperture and said clamping means both extending outside of the radius of said second bearing outer race and said cylindrical aperture in said second frame member, and said clamping means and said notch aperture being of substantially the same circumferential dimensions so as to prevent any substantial rotational movement of said clamping means or said second bearing outer race relative to said second frame member.

Further features provided by the system disclosed herein, individually or in combination, include those wherein said outer race clamping means of said second mounting means is generally cylindrical and smooth surfaced, and/or the outer race clamping means of said second mounting means is partially notched to fit over a minor portion of said second bearing outer race, and contains internal retention means to rigidly but removably grip said second bearing outer race within said notch, and/or partially notched to fit over a minor portion of said second bearing outer race and contains retention means to rigidly but removably grip second bearing outer race so that said clamping means and said outer race form an integral unit. The clamping means may consist solely of a unitary clamp removably secured only to said second bearing outer race, extending both axially and radially from said outer race and adapted to mate with said notch aperture in said second frame member, within which said clamp is axially slidable. The first and second mounting means may both consist of single, integral, removable unitary clamps secure to the respective said outer races without any modification of said outer races or any other modification of said bearings. The firsst mounting means may comprise a sheet metal clamping plate with an open side having a partially circular raised lip adapted to fit over said shaft at said open side and press the outer race of said first bearing towards said first frame member by extentions of said plate being secured to said first frame member.

All references cited in this specification, and their references, are incorporated by reference herein where appropriate for appropriate teaching of additional or alternative details, features, and/or technical background.

Various of the above-mentioned and further features and advantages will be apparent from the specific apparatus and its operation described in the example below. The present invention will be better understood by reference to this description of this embodiment thereof, including the drawing figures (approximately to scale) wherein.

Figure 1:
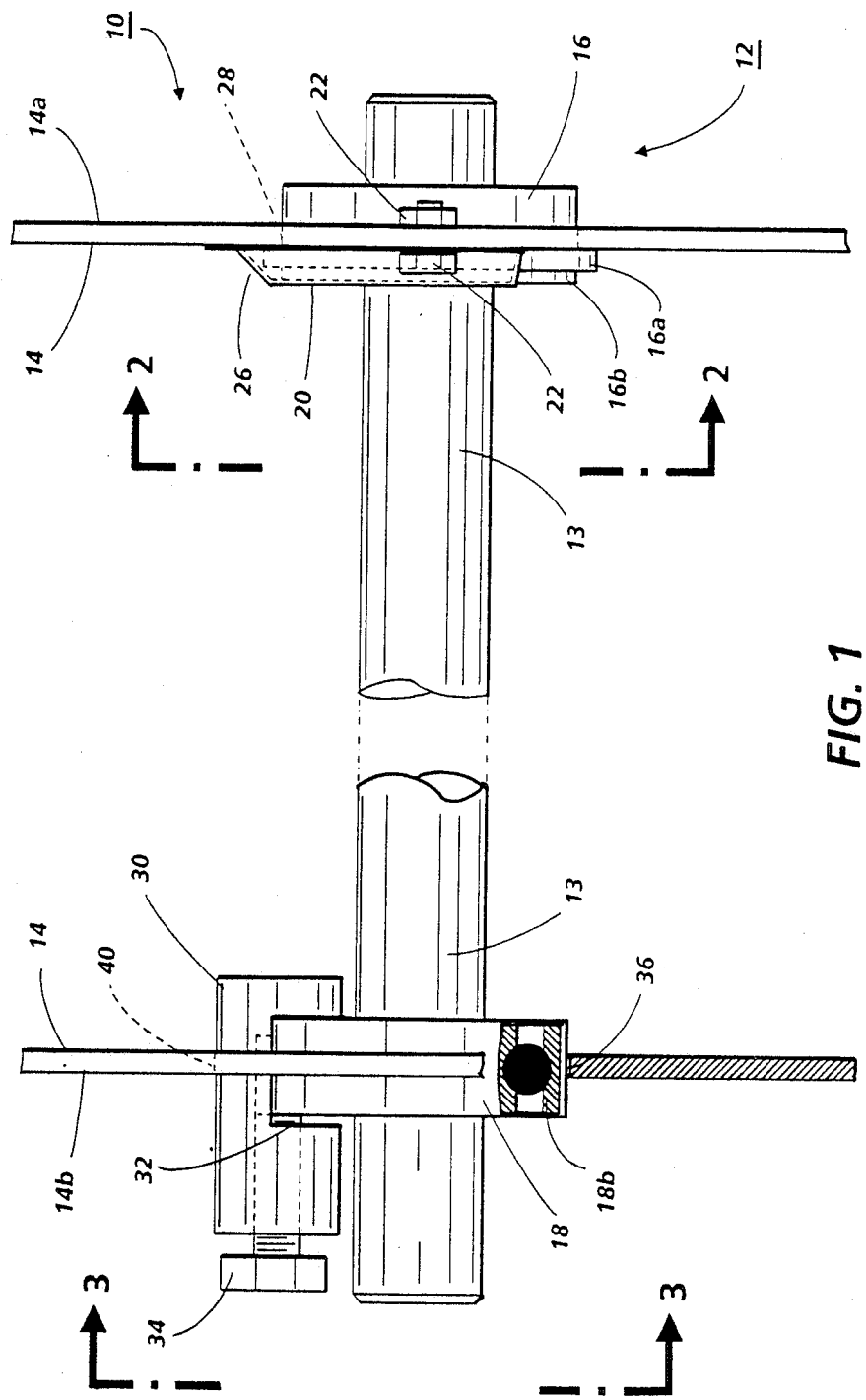
FIG. 1 is a side view of one embodyment of the subject bearing mounting system.
Figure 2:
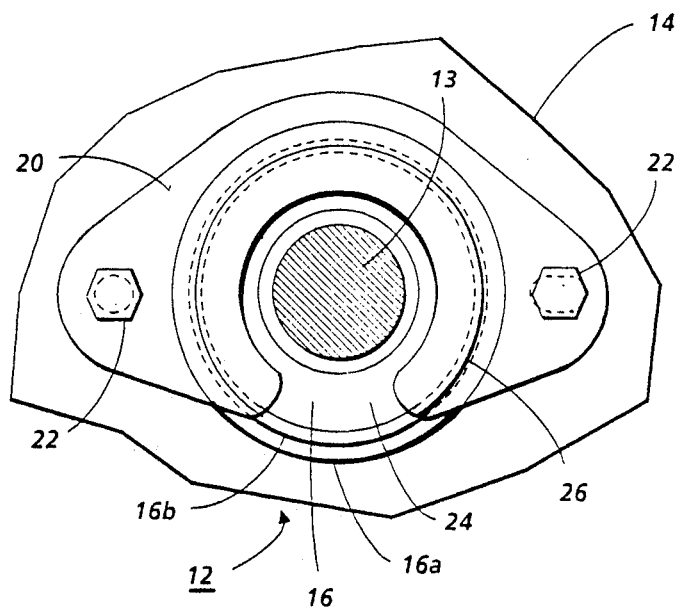
FIG. 2 is a plan view of one bearing and its mounting taken along the line 2—2 of FIG. 1.
Figure 3:
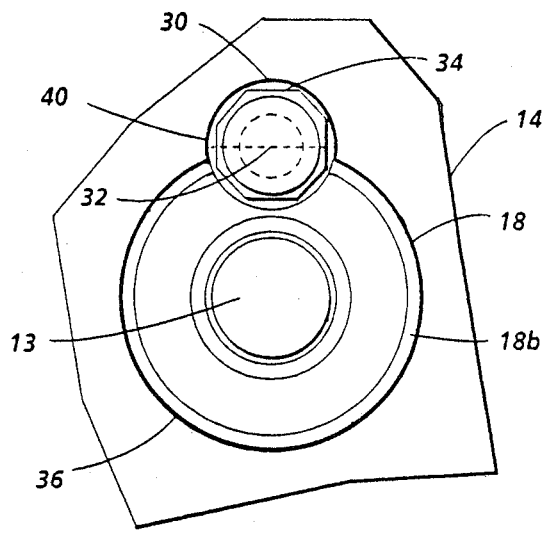
FIG. 3 is a plan view of the other bearing and its mounting taken along the line 3—3 of FIG. 1.

Describing now in further detail the example illustrated in the Figures, the bearings implemented in this disclosure example are two standard roller bearings, one (16) with a standard retaining ring, the other (18) without. The innner races of both bearings 16 and 18 are pressed on their common shaft 13, so that no relative motion exists between the inner race of the bearings and the shaft. The outer races of both bearings are slip fitted into the machine housings, but are locked by the mounting system 10 shown herein to prevent rotation.

The disclosed mounting system 10 here includes a shaft/bearing assembly 12 for mounting a rotatable shaft 13 in a copier frame 14. As indicated above, numerous said shafts and bearings are utilized in copier construction for the rotation and positioning of paper path feedwheels, etc.. Here the shaft 13 is mounted between spaced-apart frame members 14a and 14b of the copier frame 14. These normally comprise the metal or plastic or cast sheet metal frame side walls of the copier, but can be any frame member subassemblies or shaft intermediate support frames within the copier as well.

The shaft/bearing assembly 12 has a commercially available first bearing 16 at one end, of the type having a retaining ring 16a, mounted to the first frame member 14a there is a standard plain bearing 18 at the other end of the shaft 13 mounting to the second frame member 14b. The retaining ring 16a is a conventional snap ring or the like fastening in a groove on the outside of the first bearing 16 outer race 16b.

The first bearing 16 is mounted to the first frame member 14a by a first bearing retainer 20. The first bearing retainer 20 is rigidly fastened to the inside wall of the first frame member 14a by two screw or other fasteners 22 through apertures in ears or flanges extending from this bearing retainer 20. The bearing retainer 20 may be a simple stamped sheet metal member as illustrated, with an open side 24, including a less than hemicircular opening, with a raised lip 26, adapted to easily fit over and then press against more than half of the radius of the outer race 16b of the first bearing 16. The bearing 16 itself is easily mounted through an aperture 28 in the first frame member 14a slightly larger than the radius of the outer race 16b, but smaller in diameter than the retaining ring 16a. Thereby the bearing 16 fits into the aperture 28 until the retaining ring 16a is flush with the surface of the frame member 14a. As the fasteners 22 are tightened, the first bearing retainer 20 axially presses against the outer race 16b (only) of the first bearing 16, because the raised lip 26 is raised by a distance less than the distance between the inside of the outer race 16b and the retaining ring 16a. Thereby the retaining ring 16a is forced with an axial load into high friction contact with the inside surface of the first member 14a by the first bearing retainer 20.

Thus, the first bearing 16 outer race 16b is rigidly locked in position, partially inside the aperture 28 but prevented from any axial or rotational movement relative to the frame member 14a. Additionally, axial location of the shaft 13 is provided. Further, this mounting is metal-to-metal, not involving any plastic member which could allow fretting, chucking, abrasion or loosening. Yet this bearing rotation system does not require any modification, machining, damage or special manufacturing of the bearing, and the bearing retainer itself is very simple and inexpensive. Also, once the bearing retainer is removed, the bearing is free to move, and be removed and replaced. The semicylindrical open side 24 of the retainer 20 allows it to be easily mounted over, and removed from, the shaft 13, which is smaller in diameter than the opening in the open side 24.

Turning now to the other end of the shaft/bearing assembly 12, and the mounting of the second or plain bearing 18 to the second frame member 14b, this is provided in a completely different manner by a second bearing retainer 30 which is completely different from the first bearing retainer 20. The second bearing outer race 18b is freely movable within its slightly larger second round aperture 36 in the second frame member 14b. Because there is no retaining ring on the outer race 18b, the entire second bearing 18 is freely axially movable through this aperture 36.

The second bearing retainer 30 here is a small simple clamp which securely fastens to, but is removable from, the outer race 18b. Here, the second bearing retainer 30 is a small elongated metal cylinder, which may be inexpensively machined from round steel bar stock or the like, and readily manufactured as described below on a conventional turning machine.

Preferably this second bearing retainer 30 is centrally notched, approximately half way through, to form a retainer notch 32 adapted to fit over the outer race 18b as shown. That is the notch 32 has a depth slightly greater than the outer race 18b. A locking screw 34 is provided along the central axis of this bearing retainer 30, extending into the notch 32, so that when the screw 34 is tightened the bearing retainer 30 is securely locked thereby to the outer race 18b. The axis of the locking screw 34 and the bearing retainer 30 are both parallel to the shaft 13, and spaced from the shaft 13 at approximately the center of outer race 18b. It may also be seen that the bearing retainer 30 extends radially outside of, or has a larger radius than, the outer race 18b, by approximately half of the diameter of the retainer 30. The retainer 30 also is substantially longer than the thickness of the outer race 18b, so as to extend axially beyond the ends of the outer race 18b. The diameter of the retainer 30 is much smaller than the diameter of the outer race 18b, and is preferably smaller than the diameter of the inner race as well.

The second bearing retainer 30 mounts within, but is axially slidable relative to, a retainer notch 40 formed in the frame member 14b. This retaining frame notch 40 is approximately the same dimensions, at least circumferentially, as the portion of the bearing retainer 30 extending outside of the radius of the outer race 18b. The frame notch 40 is adjacent to, and preferably contiguous with, the round aperture 36, but is a radial extension thereof, i.e., is outside of the radius of the round aperture 36. Both may be punched or otherwise formed in the same operation. With the bearing retainer 30 clamped to the bearing outer race 18b, and the bearing retainer 30 rotated into alignment with the notch 40 and slid therein, the outer race 18b may be slid into the round aperture 36. No rotation of the bearing outer race 18b is possible. [Unless the second bearing retainer 30 is unfastened, which may be done simply by unscrewing the locking screw 34]. Two bearing retainers 30 and frame notchs 40 may be provided per bearing rather than one if increased security is desired.

The outer surfaces of both the second bearing outer race 18b and the bearing retainer 30 are smooth and uniform and of consistent cross-sectional dimensions. Thus, they are both freely moveable as an integral unit axially within the frame apertures 36 and 40, to allow for shaft expansion, manufacturing tolerances, mounting, etc., and thereby prevent placing any side-thrust forces on either of the two bearings. Yet the second bearing retainer 30 and its mating frame notch or aperture 40 also provide positive, metal to metal, prevention of any possibility of rotation between the outer race 18b and the second frame member 14b which could cause abrasion to these apertures or other damage to the frame member or outer race.

While the embodiment disclosed herein is preferred, it will be appeciated from this teaching that various alternatives, modifications, variations or improvements therein may be made by those skilled in the art, which are intended to be encompassed by the following claims:

What is claimed is:

1. A bearing mounting system for mounting and retaining a rotatable shaft in a machine frame between first and second rotatable bearings respectively mounted to first and second spaced frame members of said machine frame, utilizing commercially available bearings, with respective inner and outer races, andd with said shaft mounted to said inner races; comprising:
   first mounting means for rigidly mounting a first bearing outer race to one said frame member,
   said first mounting means preventing both rotational and axial movement of said first bearing outer race relative to said first frame member, and
   second mounting mans for mounting a second bearing outer race to a second frame member,
   said second mounting means providing for axial movement of said second bearing outer race relative to said second frame member but preventing rotation of said second bearing outer race relative to said second frame member,
   said second mounting means including a round aperture in said second frame member through which said second bearing outer race is axially mounted and axially moveable, and a notch aperture in said second frame member adjacent to said round aperture, and outer race clamping means removably clamped to said second bearing outer race and moveable therewith,
   said outer race clamping means of said second mounting means being axially mounted within and axially moveable within said notch aperture in said second frame member, said notch aperture and said clamping means both extending outside of the radius of said second bearing outer race and said cylindrical aperture in said second frame member, said clamping means and said notch aperture being of substantially the same circumferential dimensions so as to prevent any substantial rotational movement of said clamping means or said second bearing outer race relative to said second frame member,
   wherein said outer race clamping means of said second mounting means is partially notched to fit over a minor portion of said second bearing outer race, and contains retention means to rigidly but removably grip said second bearing outer race within said notch.

2. The bearing mounting system of claim 1 wherein said outer race clamping means of said second mounting means is generally cylindrical and smooth surfaced.

3. The bearing mounting system of claim 1 wherein said outer race clamping means is generally cylindrical and smooth surface.

4. The bearing mounting system of claim 1 wherein said clamping means consist solely of a unitary clamp removably secured only to said second bearing outer race, extending both axially and radially from said outer race and adapted to mate with said notch aperture in said second frame member, within which said clamp is axialy slidable.

5. The bearing mounting system of claim 1 wherein said first and second mounting means both consist of single, integral, removable unitary clamps secured to the respective said outer races without any modification of said outer races or any other modification of said bearings.

6. The bearing mounting system of claim 1 wherein both said bearings are mounted to said shaft by said inner races thereof being press-fitted to said shaft.

7. The bearing mounting system of claim 1 wherein said outer race clamping means is generally cylindrical and smooth surfaced, and wherein said first and second mounting means both consist of single, integral, removable unitary clamps secured to the respective said outer races without any modification of said outer races or any other modification of said bearings.

8. A bearing mounting system for mounting and retaining a rotatable shaft in a machine frame between first and second rotatable bearings respectively mounted to first and second spaced frame members of said machine frame, utilizing commercially available bearings, with respective inner and outer races, and with said shaft mounted to said inner races; comprising:

first mounting means for rigidly mounting a first bearing outer race to one said frame member, said first mounting means preventing both rotational and axial movement of said first bearing outer race relative to said first frame member, and second mounting means for mounting a second bearing outer race to a second frame member, said second mounting means providing for axial movement of said second bearing outer race relative to said second frame member but preventing rotaation of said second bearing outer race relative to said second frame member, said second mounting means including a round aperture in said second frame member through which said second bearing outer race is axially mounted and axially moveable, and a notch aperture in said second frame member adjacent to said round aperture, and outer race clamping means removably clamped to said second bearing outer race and moveable therewith, said outer race clamping means of said second mounting means being axially mounted within and axially moveable within said notch aperture in said second frame member, said notch aperture and said clamping means both extending outside of the radius of said second bearing outer race and said cylindrical aperture in said second frame member, said clamping means and said notch aperture being of substantially the same circumferential dimensions so as to prevent any substantial rotational movement of said clamping means or said second bearing outer race relative to said second frame member, wherein first mounting means comprises a metal clamping plate with an open-side having a partially circular raised lip adapted to fit over said shaft at said open side and press the outer race of said first bearing towards said first frame member by extensions of said plate being secured to said first frame member.

9. The bearing mounting system of claim 8 wherein said first bearing outer race has a integral outer retaining ring adapted to engage said first frame member when said outer race is engaged by said first mounting means.

* * * * *